United States Patent [19]
Terrasson

[11] Patent Number: 6,061,576
[45] Date of Patent: *May 9, 2000

[54] SCREEN-PHONE AND METHOD OF MANAGING THE MENU OF A SCREEN-PHONE

[75] Inventor: Jean-François Terrasson, Le Mans, France

[73] Assignee: U.S. Philips Corporation, New York, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 08/810,900

[22] Filed: Mar. 5, 1997

[30] Foreign Application Priority Data

Mar. 6, 1996 [FR] France ..................... 96 02813

[51] Int. Cl.⁷ ....................................... H04Q 7/20
[52] U.S. Cl. ............................................. 455/566
[58] Field of Search ................... 455/566, 575, 455/90; 345/337, 336, 333, 334, 335, 352, 353, 354, 146, 338, 348, 351, 173, 156; 706/11, 934, 900; 379/88.06, 88.11, 93.23, 136

[56] References Cited

U.S. PATENT DOCUMENTS

| | | | |
|---|---|---|---|
| 4,862,498 | 8/1989 | Reed | 364/927 |
| 4,964,077 | 10/1990 | Eisen et al. | 379/355 |
| 5,042,006 | 8/1991 | Flohrer | 345/337 |
| 5,115,501 | 5/1992 | Kerr | 395/600 |
| 5,220,675 | 6/1993 | Padawer et al. | 345/335 |
| 5,425,077 | 6/1995 | Tsoi | 379/58 |
| 5,432,902 | 7/1995 | Matsumoto | 345/337 |
| 5,436,954 | 7/1995 | Nishiyama et al. | 455/550 |
| 5,459,488 | 10/1995 | Geiser | 345/337 |
| 5,630,159 | 5/1997 | Zancho | 395/800 |
| 5,664,066 | 9/1997 | Sun et al. | 706/25 |
| 5,671,140 | 9/1997 | Bessacini et al. | 706/900 |
| 5,675,752 | 10/1997 | Scott et al. | 345/333 |
| 5,884,248 | 3/1999 | Hall | 455/31.2 |

FOREIGN PATENT DOCUMENTS

| | | | |
|---|---|---|---|
| 0269364A2 | 6/1988 | European Pat. Off. | G06F 3/023 |
| 0292934A2 | 11/1988 | European Pat. Off. | G06F 3/023 |
| WO9201983 | 2/1992 | WIPO | G06F 3/023 |

Primary Examiner—Dwayne D. Bost
Assistant Examiner—Jean A. Gelin
Attorney, Agent, or Firm—Dicran Halajian

[57] ABSTRACT

A screen-phone, notably a radiotelephone, provides a display of a plurality of available functions in the form of a tree menu wherein the user can signify his selections. In order to improve the user's efficiency in handling such a menu, the screen-phone includes modeling means for modeling the user's behavior in making menu selections, including his rate of choosing each particular function as weighted by the number of returns made due to his level of inexperience with such functions. The processing calculations are performed using fuzzy logic. The menu tree is then rearranged to more closely correspond with the user's behavioral model.

20 Claims, 4 Drawing Sheets

SCREEN-PHONE AND METHOD OF MANAGING THE MENU OF A SCREEN-PHONE

FIELD OF THE INVENTION

The present invention relates to a screen-phone, notably a radiotelephone, comprising a plurality of functions proposed to a user in the form of a tree menu.

The invention likewise relates to a method of managing a tree menu of a screen-phone, said menu proposing a plurality of functions to a user.

BACKGROUND OF THE INVENTION

Screen-phones currently available on the market offer an ever larger variety of user functions to a user. For example, in the case of a radiotelephone, the user is currently offered functions of message handling, call transfer, regulation of a certain number of operating parameters of the radiotelephone (selection from the ringing of the bell, the language in which messages are to be displayed) welcome message . . . ).

Similarly, the current tendency is to miniaturize these types of consumer devices as much as possible. The screens of these telephones are thus of limited size which, for the user, leads to a certain complexity of handling the man/machine interface. For radiotelephones, for example, there are only several lines on the screen to show the tree menu. so that user runs the risk of being lost when there is a large menu.

To facilitate the user's handling of the tree menu, in certain telephones currently available on the market the functions which are not available to the user appear as crossed out on the screen of the telephone (certain functions may indeed not be available depending on the nature of the rights of the user or on the type of subscription contract he has concluded).

SUMMARY OF THE INVENTION

It is an object of the present invention to propose a solution which permits of significantly improving the user's handling of such a tree menu.

Therefore, a screen-phone as described in the opening paragraph is characterized in that it comprises:
    modeling means for modeling the user's behavior when he goes through said menu, and
    menu adapting means for taking said behavior into account.

In a first embodiment, a screen-phone according to the invention comprises:
    calculation means for calculating, on the basis of said behavior, the relative importance to the user of at least certain proposed functions, and
    rearranging means for rearranging said functions in the menu in dependence on their relative importance.

The menu thus proposes the functions in the order of importance to the user. The handling of the menu is thus facilitated thereby.

In a second embodiment, a screen-phone according to the invention which has a plurality of help levels for the user comprises:
    calculation means for calculating, on the basis of said behavior, the user's agility, and
    selection means for selecting a help level adapted to the user's agility.

Thus, the user is offered help which is all the more complete as his agility is poor.

In a particularly advantageous approach, the user's behavior is modeled at least by a first set of input parameters called main parameters which represent the user's selection rate of at least certain functions, and by a second set of input parameters called weighting parameters which represent the user's inexperience of handling the menu.

Thus, in the first embodiment of the invention the most frequently selected functions have a relatively great importance, but the relative importance of a function diminishes when the user who has selected them is inexperienced. Indeed, in that case it is highly probable that the apparatus has been lent to a user who is not the habitual user. Therefore, it is not desirable for the tree structure of the menu to be radically modified. And in the second embodiment, the user's agility for a defined function is all the higher as the function is selected more frequently, but it is all the lower as the user is inexperienced.

Advantageously, said weighting parameter is representative of the number of returns made by the user in the tree structure of the menu before he makes a selection in the menu.

Indeed, the inexperienced user runs the risk of making a mistake when searching for a function and will thus be induced to make returns in the menu tree. This weighting parameter is thus particularly significant of the inexperience of the user.

Finally, fuzzy logic is advantageously used in the calculation means for calculating the relative importance of a function and/or of the user's agility.

In effect, fuzzy logic techniques are particularly well adapted to modeling the human behavior.

BRIEF DESCRIPTION OF THE DRAWINGS

These and other aspects of the invention will be apparent from and elucidated with reference to the embodiments described hereinafter.

In the drawings.

DESCRIPTION OF PREFERRED EMBODIMENTS

Now there will be described in detail an example relating to the first embodiment of the invention. The principles implemented are similarly applicable to the second embodiment.

Figure 1:
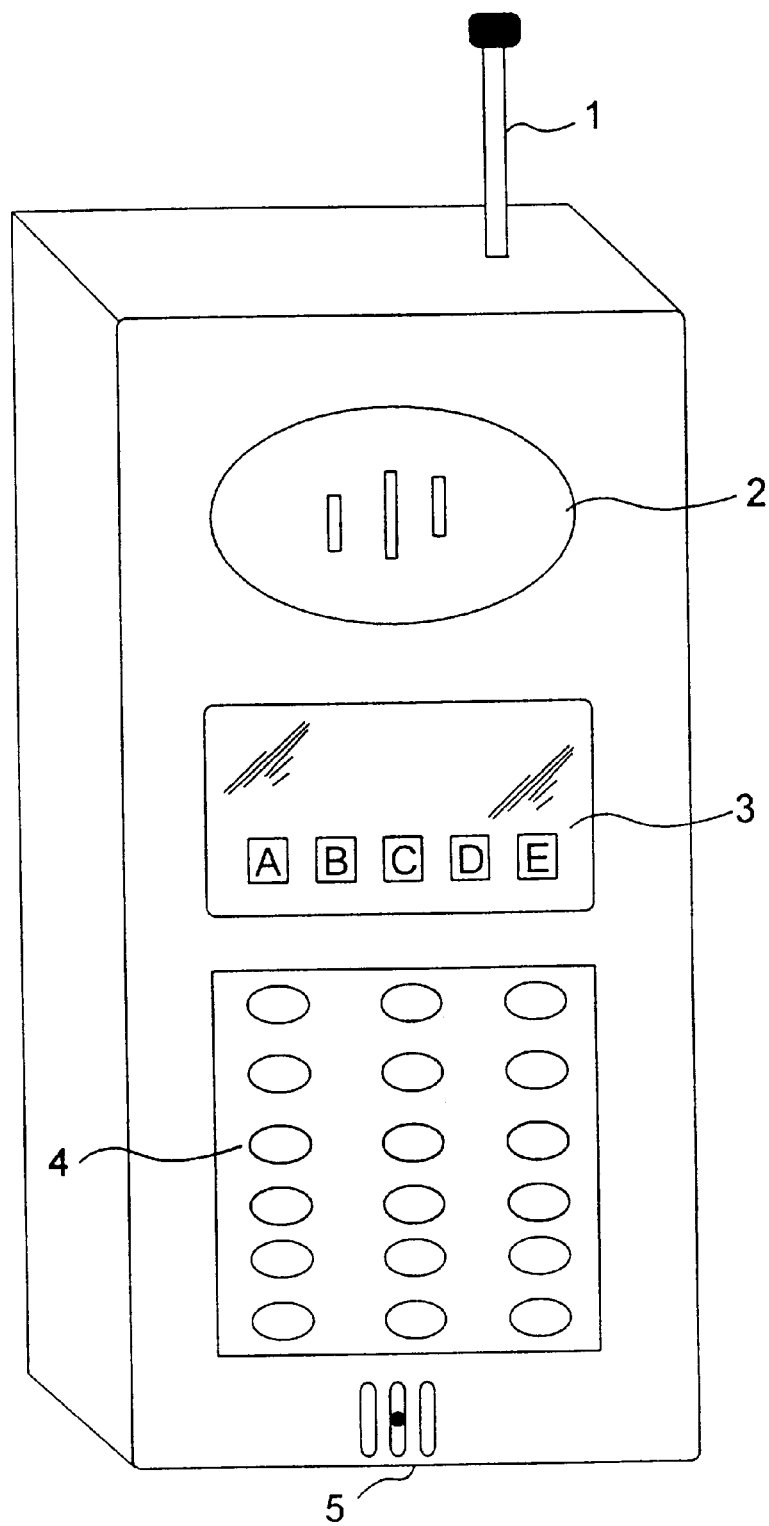
FIG. 1 represents an example of a screen-phone according to the invention.

FIG. 1 shows an example of a telecommunications screen apparatus according to the invention. This apparatus notably comprises an aerial 1, a loudspeaker/receiver 2, a screen 3, a keypad 4 and a microphone 5. Five main inputs referenced A to E in the menu are shown on the bottom line of the screen 3.

An example of a tree menu is giver below by way of example for a radiotelephone:

Input A: Setting of the Parameters
→Language displayed→French
→English
→. . .
→Lighting of the screen
→Type of ringing bell→ringing bell S1
→ringing bell S2
→ringing bell S3
→Volume of the ringing bell
→Welcome message
→Battery discharge indicator→"ON"
→"OFF"
→Beep associated to the keys→"ON"
→"OFF"
Input B: Messages
→Voice mail box
→Reading of new messages
→Reading of all the messages
→Message formation
→Sending of message
→Message modification
→Message destruction
Input C: Call Parameters
→Last call
→Duration of the call
→Duration of the call on line
→Cost of the call
Input D: Services
→Call identification
→Transmission
→Blocking
→Call stand-by
Input E: Security
→Acquisition of access code
→Change of access code
→Locking of the keypad
→Call restriction This menu thus comprises 3 function levels: the first level corresponds to the inputs A to E, the second level corresponds to the possible actions and the third level to the various available options for each action. The user is thus led to move in the menu tree to execute the desired operation. In the following of the description the user is said to make a selection when he goes from a level 2 to a level 3 in the tree structure. And in the described example, for clarity of the exposé, only a rearrangement of the inputs will be considered.

One of the objects of the present invention is to enable the user to find the function he searches for in the tree menu in the easiest possible way. Therefore, the invention notably consists of modifying the arrangement of the menu so as to first propose to the user the inputs corresponding to the functions he uses most frequently, while the tree structure, however, is to remain sufficiently stable so as not to disturb the user. Moreover, the invention has for its object to take the fact into account that the telephone can be lent to another user. In that case, the menu need not be rearranged radically.

For taking these various restrictions into account, the invention consists in the first instance of modeling the behavior of the user. Therefore, two parameters are defined. The first parameter, called main parameter and denoted $S(k)$, is representative of the user's rate of choosing the input k. The second parameter, called weighting parameter and denoted $R(k)$ represents the user's inexperience with input k. In the described example, the chosen weighting parameter depends on the number of returns carried out by the user before making a selection. The calculation formulas of these two parameters will be given in the following of the description. The user's behavior being modeled in this manner, the invention thus consists of adapting the consequently proposed menu. In the example which will be described, a parameter $FIT(k)$ which represents the relative importance of input k to the user is formed on the basis of the parameters $S(k)$ and $R(k)$.

Figure 2:
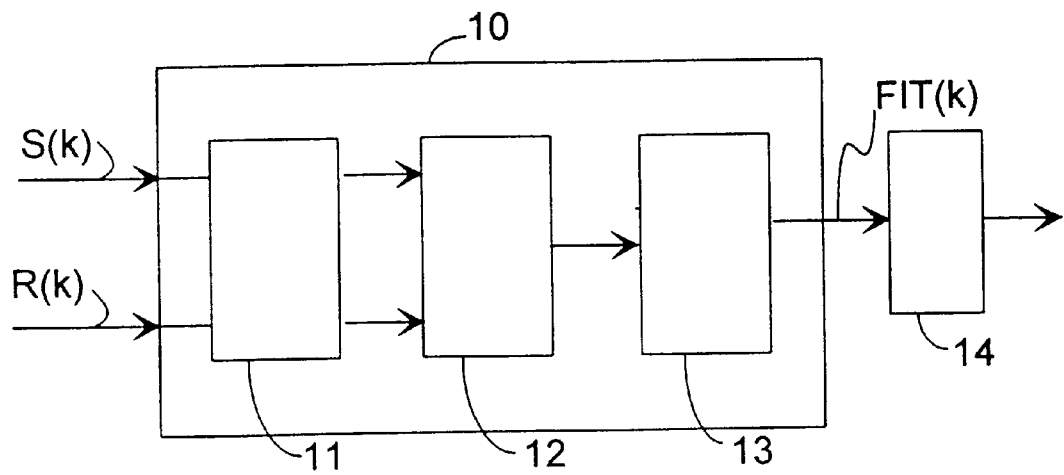
FIG. 2 is a block diagram according to the invention describing the operation of such a telephone.

FIG. 2 is a block diagram describing the operation of a telephone according to the invention.

According to FIG. 2, when the user makes a selection (passes from a level 2 to a level 3 in the tree menu), the parameters $S(k)$ and $R(k)$ relating to all the inputs of the menu are calculated and then transmitted to a fizzy logic calculation module 10. This module 10 forms an output parameter $FIT(k)$ on the basis of each parameter pair $\{S(k), R(k)\}$, which output parameter $FIT(k)$ corresponds to the relative importance of input k. This calculation module 10 is formed by three function blocks denoted 11, 12 and 13 respectively, called "fuzzification" block, inference engine and "defuzzification" block.

The output variables $FIT(k)$ are then supplied to a comparator 14. Only the comparisons of which the result is higher than a predefined threshold lead to a non-zero decision on the output of the comparator, that is to say, to a rearrangement of the menu. In practice, when the parameter FIT varies between 0 and 100 (as is the case in the example described with reference to FIGS. 3 and 4), the threshold of the comparator is fixed, for example, at 15.

Now there will be described the behavior and the operation of the calculation module 10 with the aid of FIGS. 3 and 4.

The fuzzy logic consists of classifying the three parameters $S(k)$, $R(k)$ and $FIT(k)$ by order of magnitude. In the described example, each of these parameters may belong to three different fuzzy sets. In the FIGS. 3 and 4, these sets are referenced by two letters: the first letter S, M or B indicates whether the set corresponds to a small, medium or large value of the parameter; the second letter S, R or F indicates the parameter in question $S(k)$, $R(k)$ or $FIT(k)$, respectively. In fuzzy logic, a parameter may belong to various sets which have different degrees of relationship, which permits of obtaining a progressive transition between states. The various sets defined for each of the three parameters are thus superposed.

For defining the sets associated to each parameter, a function called relationship function is used. These functions are denoted FS, FR and FF for the respective parameters $S(k)$, $R(k)$ and $FIT(k)$.

Figure 3:
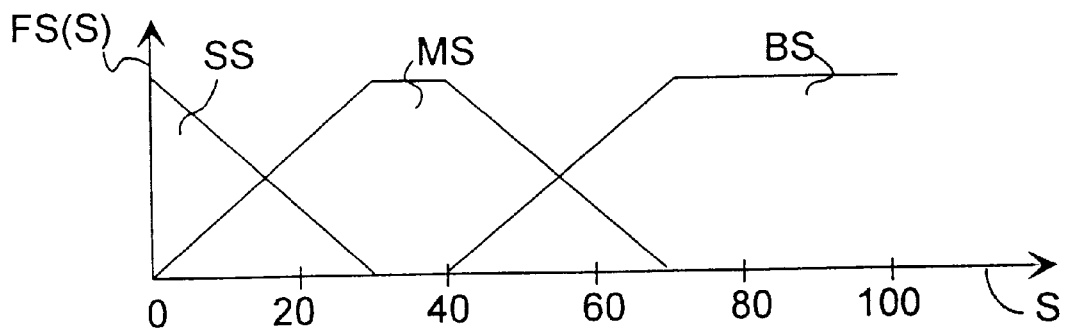
FIG. 3 represents the associated functions defined for the fuzzy logic calculation.
Figure 3:
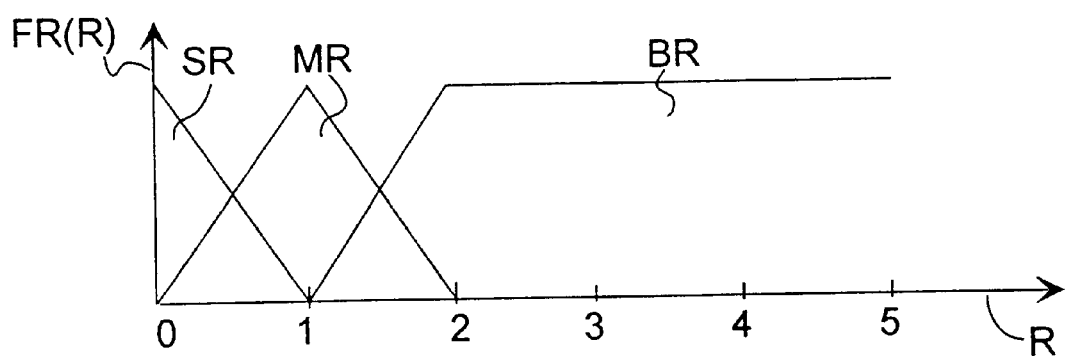
Figure 3:
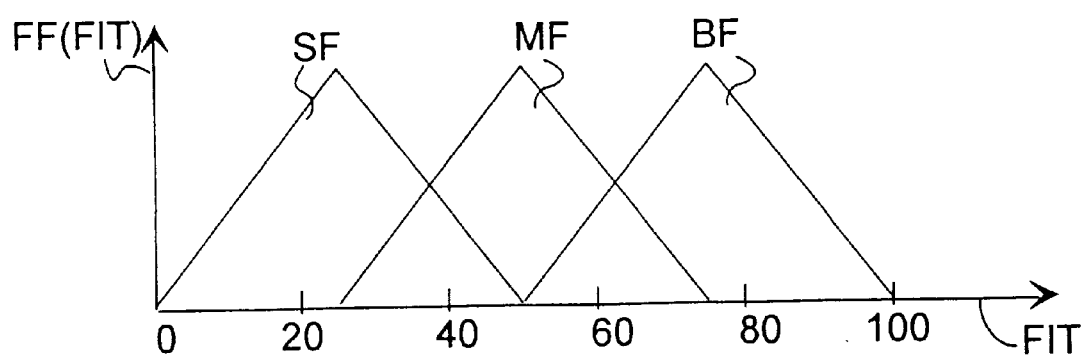
Figure 4:
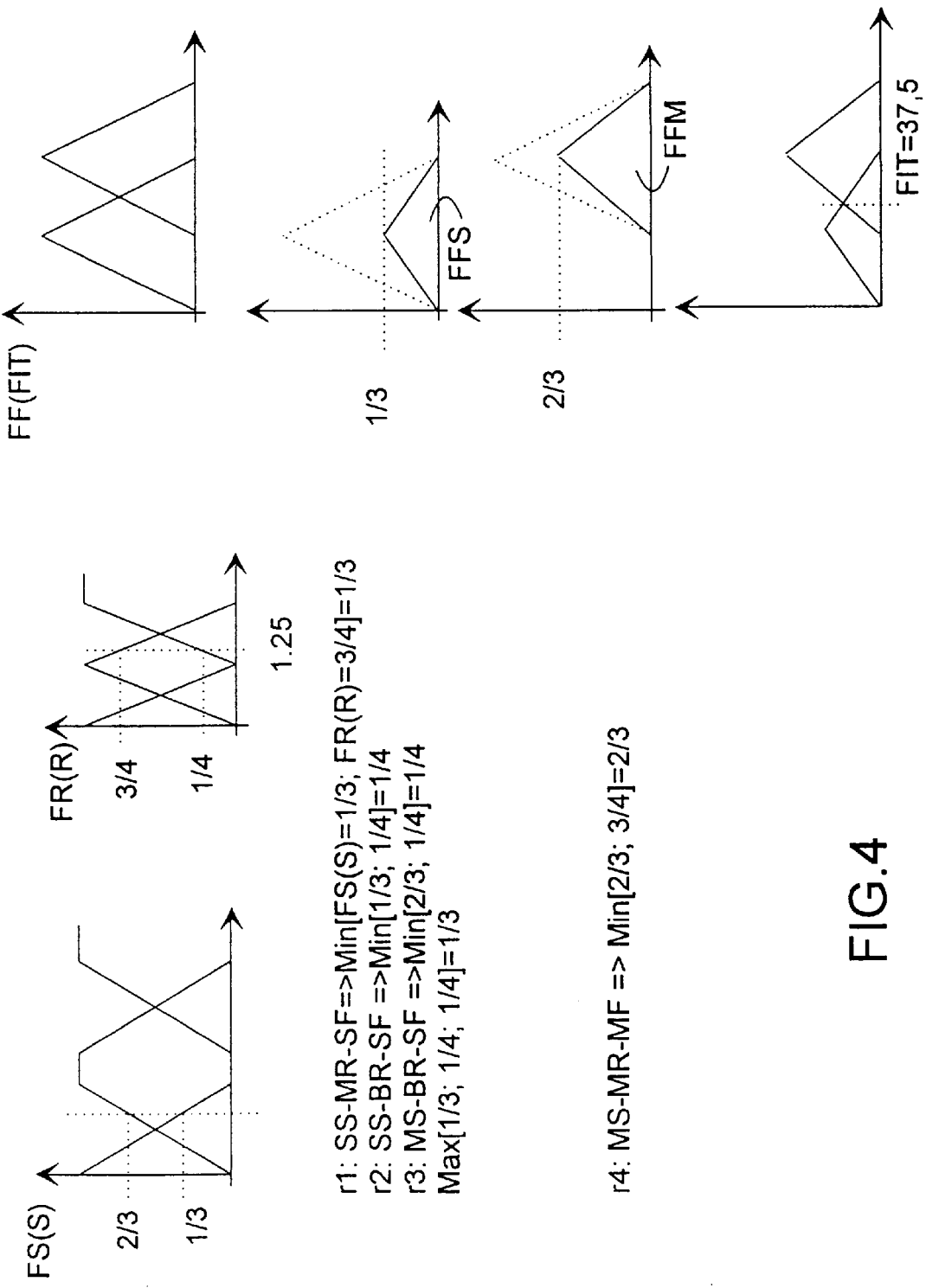
FIG. 4 is a diagram explaining calculations made by the fuzzy logic module represented in FIG. 2.

The relationship functions chosen for the present invention are shown in FIGS. 3 and 4. These functions have the form of triangles and/or trapeziums of which the tops correspond to the following points:

$\{[(0, 1): (30, 0)]$–$[(0, 0); (30, 1); (40, 1); 70,0)]$–$[(40, 0); (70, 1);$ extended by the line of equation y=1]$\}$ for the function FS, $\{[(0, 1); (1, 0)]$–$[(0, 0); (1, 1); (2, 0)]$–$[(1, 0); (2, 1);$ extended by the line of equation y=1]$\}$ for the function FR, $\{[(0, 0); (25, 1); (50, 0)]$–$[(25, 0); (50, 1); (75, 0)]$–$[(50, 0); (75, 1); (100, 0)]\}$ for the function FF.

The "fuzzification" block 11 determines the degree to which the input parameters $S(k)$ and $R(k)$ are members of the fuzzy sets thus defined.

At the level of the inference engine 12, rules are defined for determining the membership of the output parameter $FIT(k)$ as a function of the membership of the input parameters S(k) and R(k). The rules chosen in this embodiment are indicated in the following Table.

|    | SS | MS | BS |
|----|----|----|----|
| SR | MF | BF | BF |
| MR | SF | MF | BF |
| BR | SF | SF | MF |

These basic rules have been chosen so that the parameter FIT(k) is all the higher as the parameter S(k) is higher, and all the lower as the parameter R(k) is higher. Indeed, when the user is lost in the menu, that is, when he makes a considerable number of returns, it is not necessary to lay too much weight or the selected function. Indeed, such a behavior proves that the user is not accustomed to selecting this function, or that he is not the habitual user of the telephone. On the other hand, if the user directly reaches the selected function, much importance must be given to that function.

For each applicable rule (input sets→output set), the degree of membership to the output set is equal to the minimum of the degrees of membership of the input parameters S(k) and R(k) to the input sets. The inference engine retains for each obtained output set the maximum degree of membership to the input sets. An output function denoted FFS, FFM or FFB depending on the set S, M or B under consideration, is then deduced from this maximum degree of membership and of the membership function FF.

The "defuzzfication" block 13 thus determines the output parameter FIT(k) by calculating the center of gravity of the output functions. The parameter FIT(k) corresponds to the abscissa of this center of gravity.

FIG. 4 gives an example of a calculation of an output parameter FIT(k). In this example, the input paramreters S(k) and R(k) have the following values:

S(k)=20

R(k)=1.25

The degrees to which the parameter S(k) is a member of the sets SS and MS are thus equal to ⅓ and ⅔, respectively. Similarly, the degrees to which the parameter R(k) is a member of the sets MR and BR are equal ¾ and ¼ respectively. The four rules that can be applied are thus the following:

Rule r1: if SS and MR then SF

Rule r2: if SS and BR then SF

Rule r3: if MS and BR then SF

Rule r4: if MS and MR then MF

For each of these rules the degree of membership to the output set is equal to the minimum of the degrees of membership of the input parameters to the input sets. In this manner, a degree of membership equal to ⅓, ¼, ¼ and ⅔ is thus obtained for the rules r1 to r4, respectively.

The maximum degrees of membership obtained for the output sets SF and MF are thus ⅓ and ⅔, respectively. The output functions FFS and FFM shown in the right-hand part of FIG. 4 are thus derived therefrom. These functions have the form of isosceles triangles whose tops respectively correspond to the following points:

{(0,0); (25, ⅓); (50, 0)} for the function FFS

{(25,0); (50, ⅔); (75,0)} for che function FFM.

The output parameter FIT(k) is given by the abscissa of the center of gravity of the output functions. Thus, FIT(k)=37.5 is obtained.

Figure 5:
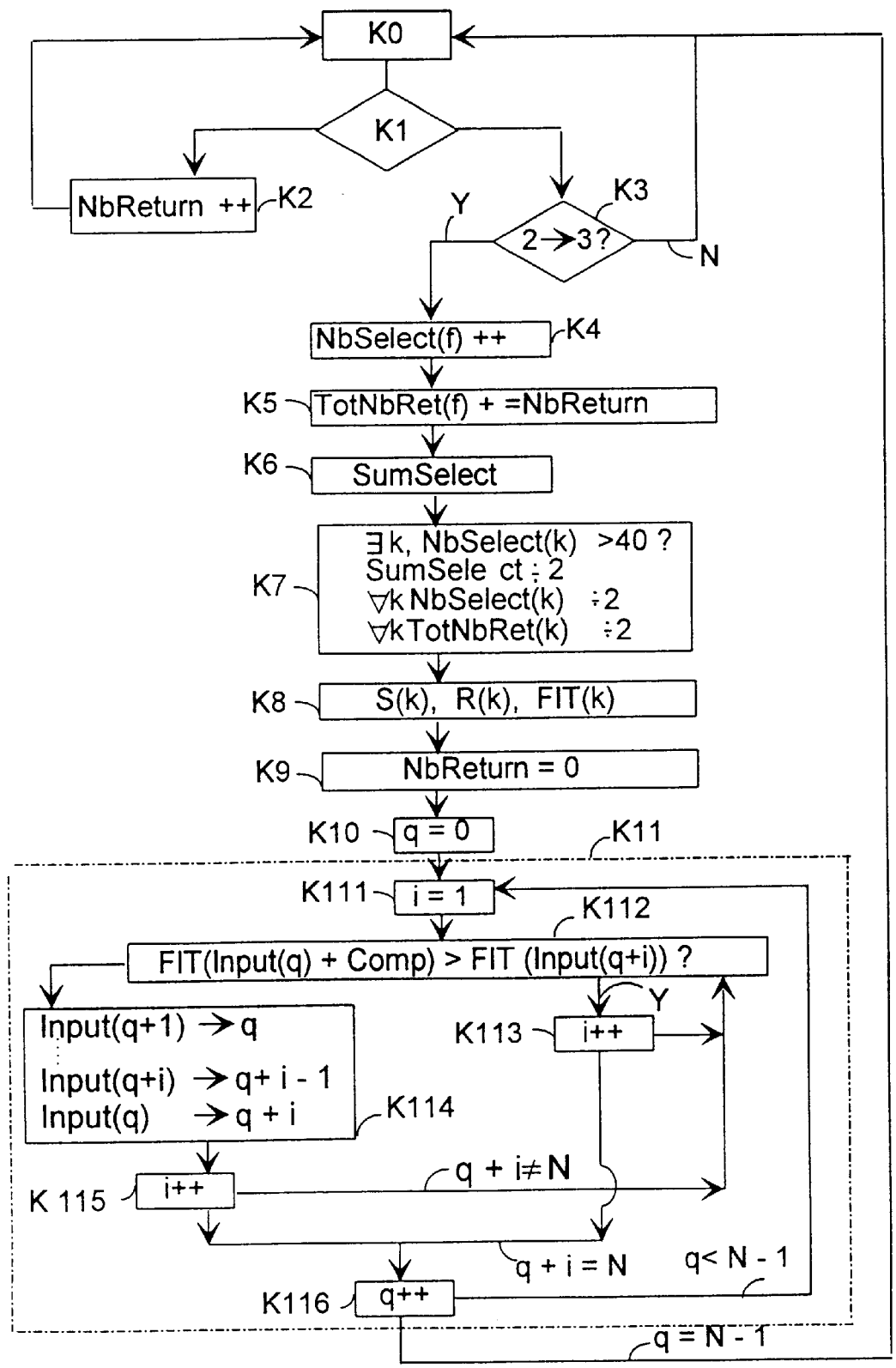
FIG. 5 is a flow chart describing a management method for managing a tree menu of a screen-phone according to the invention.

Now the method according to the invention will be described with the aid of FIG. 5.

When the user moves through the menu (passes from box K0 to box K1 of the flow chart), a test is carried out (box K1) to determine whether this move corresponds to a return in the menu tree. In that case, a variable NbReturn is incremented by one unit (box K2), after which the method is resumed at box K0. If not, a test is made in box K3 to determine whether a transition from the level 2 to the level 3 in the menu tree is made. Such a transition indeed constitutes a selection. The corresponding input in the tree of the menus is denoted f. If the move by the user does not correspond to a transition from the level 2 to the level 3, the method is resumed at box K0. If not, box K4 is proceeded to.

At box K4, the selection number of input f denoted NbSelect(f) is incremented by one unit. Then, at box K5 the variable NbReturn is added to the total number of returns wade for selecting the input f. In FIG. 5 this total number of returns for the input f is denoted TotNbRet(f). In box K6 are then calculated the total number of selections, denoted SumSelect, which is equal to the sum of the number of selections of all the inputs of the menu:

$$\text{SumSelect} = \Sigma_k \text{NbSelect}(k)$$

In box K7, if the selection number NbSelect(k) for an input K of the menu is higher than a fixed threshold (for example 40), the parameters SumSelect, NbSelect(k) and TotNbRet(k) are divided by two for all the inputs k to avoid the system being saturated. The method is then proceeded with box K8. For each input k of the menu is calculated:

the main parameter S(k):

$$S(k) = \frac{NbSelect(k)}{SumSelect}$$

the weighting parameter R(k):

$$R(k) = \frac{TotNbRet(k)}{NbSelect(k)}$$

the output parameter FIT(k) which is so calculated as has been explained earlier with the aid of FIGS. 3 and 4.

Then, in box K9, the variable NbReturn is reset to zero.

The method is proceeded in box K10 for a comparison of the values of the output parameters obtained for the various inputs of the menu. When an input Input(rg1) of which the rank rg1 is smaller than rg2, has a value FIT(input(rg1)) that is smaller than the value (FIT(input(rg2))+Comp) of an input Input(rg2) of rank rg2, the menu is rearranged (Comp is a fixed number which permits of imposing a sufficiently high difference between FIT(Input(rg1)) and FIT(Input (rg2)) before the rearrangement is effected). Thus, in box K10 a loop variable q is initialized at zero. The method thus consists of executing the contents of box K11, as long as the value of this loop variable q is different from (N−1), N being equal to the number of inputs in the menu.

The box K11 regroups various steps having the numbers K111 to K116. In box K111 a second loop variable i is initialized at 1. As long as (q+1) is different from N, the contents of the boxes K112 and K115 are executed. In box K112 the following comparison is made:

$$\text{FIT}(\text{Input}(q)) + \text{Comp} > \text{FIT}(\text{Input}(q+i))?$$

If the result of this comparison is positive, the method is proceeded to box K113. If not, box K114 is proceeded to. In box K113, the loop variable i is incremented by one unit after which the method is resumed at box K112. In box K114, the menu is rearranged: the inputs Input(q+1) to Input(q+i) make a leap to the left in the menu, that is, their rank is decremented by one unit. And the input Input(q) is transferred to the rank q+i. Then, in box K115, the loop variable i is initialized at 1 and the method is resumed at box K112.

When (q+i) equals N, the loop K112 is left for K115, and the method is proceeded to box K116. At box K116, the loop variable q is incremented and the method is resumed at box K111. When the variable q is equal to N−1, the loop K11 is left and the method is resumed at box K0.

The method which has just been described is advantageously implemented in a telecommunications apparatus with a screen, which comprises a microprocessor in the form of a program. By way of example, a 68000 microprocessor by Motorola can be used and a programming language such as the C-language can be used.

A person of ordinary skill in the art having a general knowledge of programming languages is capable of implementing this.

The description that has just been made is applicable to the second embodiment of the invention according to which the user is offered help adapted to his behavior. In this embodiment, the input parameters are used for determining the user's agility which is classified in three levels: Novice, Intuitive or Expert.

Obviously, modifications may be introduced into the preferred embodiment that has just been described, without one leaving the scope of the present invention.

It is particularly possible to define other parameters for modeling the user's behavior. For example, the weighting parameter may take into account that an item of the menu is read several times, that a function is rapidly selected, how long the keys are touched, or a combination of these various parameters . . .

It is also possible to use a number of fuzzy sub-sets higher than three which, however, would result in an enhancement of the calculation complexity.

Moreover, although a limitation to one rearrangement between the inputs of the first level of the tree menu is made in this exemplary embodiment, it is possible to extend this rearrangement to all the levels of the tree.

What is claimed is:

1. A screen-phone capable of providing one or more of a plurality of available functions as selected by a user from an initial tree menu of said functions displayed on a display, said initial tree menu being a default menu which is displayed first on said display, said screen-phone comprising:

modeling means for developing a behavioral model of the user's behavior in making selections from the initial tree menu, the behavioral model taking into account the user's preferences and relative inexperience in regard to each of said selections; and menu adjusting means for modifying the initial tree menu in accordance with said behavioral model to form a modified tree menu and changing said default menu to said modified tree menu.

2. The screen-phone as claimed in claim 1, wherein the behavior of the user is modeled at least by main parameters which represent the user's selection rate of at least certain functions, and by weighting parameters which represent the user's inexperience of handling the initial tree menu.

3. The screen-phone as claimed in claim 2, wherein said weighting parameters is representative of the number of returns made by the user in the initial tree menu before making a selection.

4. The screen-phone as claimed in claim 1, further comprising:

calculation means for calculating, based on said behavioral model, the relative importance to the user of at least certain of the functions in the initial tree menu;

wherein said menu adjusting means rearranges the functions in the initial tree menu in accordance with their relative importance to the user to form said modified tree menu.

5. The screen-phone as claimed in claim 4, wherein said calculation means utilize fuzzy logic in making said calculation.

6. The screen-phone as claimed in claim 1, wherein said initial tree menu includes a plurality of help levels for the user, and further comprising:

calculating means for calculating, on the basis of said behavioral model, the user's ability in selecting functions in the initial tree menu; and selection means for selecting a help level in accordance with the calculated ability of the user.

7. The screen-phone of claim 1, wherein said modified tree menu is displayed first on said screen if said initial tree menu tree is modified.

8. A method of managing displaying of a tree menu of a plurality of available functions of a screen-phone displayed on a display, said functions being selectable from said display by a user; said method comprising:

displaying a default menu formed from said tree menu, said default menu being displayed first on said display;

developing a behavioral model of the user's behavior in selecting functions from the tree menu, the behavioral model taking into account the user's preferences and relative inexperience in regard to each of said functions;

modifying the tree menu in accordance with said behavioral model to form a modified tree menu; and changing said default menu to said modified tree menu.

9. The method as claimed in claim 8, wherein the user's behavior is modeled by main parameters which are representative of the user's selection rate of at least certain functions, and by weighting parameters which represent the user's inexperience in handling the tree menu.

10. The method as claimed in claim 9, wherein said weighting parameters represents of the number of returns made by the user in the tree structure of the menu before making a selection in the menu.

11. The method as claimed in claim 8, further comprising:

calculating, based on said behavioral model, the relative importance to the user of at least certain of the functions in the tree menu; and rearranging the functions in the tree menu in accordance with their relative importance to the user to form said modified tree menu.

12. The method as claimed in claim 11, wherein said calculations utilize fuzzy logic.

13. The method as claimed in claim 8, further comprising:

calculating, on the basis of said behavioral model, the user's ability in selecting functions in the tree menu; and selecting a help level in accordance with the calculated ability of the user.

14. The method of claim 8, further comprising displaying first said modified tree menu next time said user access said tree menu if said tree menu is changed.

15. A menu rearrangement device comprising:
- a screen for first displaying a current default menu, said current default menu being included in a menu tree having a plurality of options and being displayed first on said screen;
- an input module which receives a first signal and a second signal each time a user selects a selected option from said menu tree, said first signal being indicative of an importance of a selected option, and said second signal being indicative of familiarity of said user with said menu tree; and
- an output module which outputs a third signal in response to said first signal and said second signal; wherein said menu tree is modified to form a modified menu tree if said third signal exceeds a predetermined threshold; wherein options of said modified menu tree are rearranged in a relative order of importance to said user.

16. The menu rearrangement device of claim 15, wherein a new default menu is displayed first on said screen if said menu tree is modified, said new default menu being formed from said modified menu tree.

17. The menu rearrangement device of claim 15, wherein said default menu is not modified when said second signal indicates that said familiarity is below a predetermined level.

18. The menu rearrangement device of claim 15, further comprising a comparator which compares said third signal with said predetermined threshold.

19. The menu rearrangement device of claim 15, wherein said first signal is indicative of a number of times said selected option is selected.

20. The menu rearrangement device of claim 15, wherein said first signal is indicative of a number of times said selected option is selected; and wherein said second signal is indicative of one of a number of returns to a different option before selecting said selected option, a rapidity of selecting said selected option, and a length of time a key used for selecting said selected option is activated.

* * * * *